US008290223B2

(12) United States Patent
Suliga et al.

(10) Patent No.: US 8,290,223 B2
(45) Date of Patent: Oct. 16, 2012

(54) METHOD FOR SEGMENTING DIGITAL MEDICAL IMAGE

(75) Inventors: Marek Suliga, Koszalim (PL); Piet Dewaele, Sint-Niklaas (BE); Rudi Deklerck, Vilvoorde (BE); Edgard Nyssen, Brussels (BE); Gert Behiels, Edegem (BE)

(73) Assignee: Agfa HealthCare N.V., Mortsel (BE)

( * ) Notice: Subject to any disclaimer, the term of this patent is extended or adjusted under 35 U.S.C. 154(b) by 1284 days.

(21) Appl. No.: 11/923,201

(22) Filed: Oct. 24, 2007

(65) Prior Publication Data

US 2008/0101678 A1     May 1, 2008

Related U.S. Application Data

(60) Provisional application No. 60/862,894, filed on Oct. 25, 2006.

(30) Foreign Application Priority Data

Oct. 25, 2006    (EP) ..................................... 06122899

(51) Int. Cl.
    *G06K 9/00*       (2006.01)
(52) U.S. Cl. .......................... 382/128; 382/132; 382/228
(58) Field of Classification Search ................... 382/128
See application file for complete search history.

(56) References Cited

U.S. PATENT DOCUMENTS

| | | | | |
|---|---|---|---|---|
| 4,945,478 A | * | 7/1990 | Merickel et al. ............. | 382/131 |
| 6,037,976 A | * | 3/2000 | Wixson ........................ | 348/122 |
| 6,922,489 B2 | * | 7/2005 | Lennon et al. ................ | 382/228 |
| 7,711,174 B2 | * | 5/2010 | Sammak et al. .............. | 382/133 |
| 2004/0013292 A1 | * | 1/2004 | Raunig ......................... | 382/128 |

FOREIGN PATENT DOCUMENTS

| | | |
|---|---|---|
| EP | 0 610 605 A1 | 8/1994 |
| EP | 0 742 536 A1 | 11/1996 |
| EP | 0 887 769 A1 | 12/1998 |

OTHER PUBLICATIONS

Balleyguier, C., et al., "Computer-aided detection (CAD) in mammography: Does it help the junior or the senior radiologist?" European Journal of Radiology, vol. 54, pp. 90-96, 2005.
Boukerroui, D., et al., "Multiresolution texture based adaptive clustering algorithm for breast lesion segmentation," European Journal of Ultrasound, vol. 8, pp. 135-144, 1998.
Comer, M., et al, "Segmentation of Textured Images Using a Multiresolution Gaussian Autoregressive Model," IEEE Transactions on Image Processing, vol. 8, No. 3, pp. 408-420, Mar. 1999.

(Continued)

*Primary Examiner* — Phillip A Johnston
(74) *Attorney, Agent, or Firm* — Houston & Associates, LLP

(57) ABSTRACT

A Markov Random Field (MRF)-based technique is described for performing clustering of images characterized by poor or limited data. The proposed method is a statistical classification model that labels the image pixels based on the description of their statistical and contextual information. Apart from evaluating the pixel statistics that originate from the definition of the K-means clustering scheme, the model expands the analysis by the description of the spatial dependence between pixels and their labels (context), hence leading to the reduction of the inhomogeneity of the segmentation output with respect to the result of pure K-means clustering.

20 Claims, 11 Drawing Sheets

OTHER PUBLICATIONS

Faber, V., "Clustering and the Continuous k-Means Algorithm," Los Alamos Science, No. 22, pp. 138-144, 1994.

Khalighi, M., et al., "Unsupervised MRI segmentation with spatial connectivity," Proceedings of the SPIE—The International Society for Optical Engineering SPIE-INT. Soc. Opt. Eng USA, vol. 4684, pp. 1742-1750, 2002.

Pappas, T., et al., "An Adaptive Clustering Algorithm for Image Segmentation," International Conference on Acoustics, Speech and Signal Processing, pp. 1667-1670, May 23, 1989.

Sung, K., et al., "Example-Based Learning for View-Based Human Face Detection," IEEE Transactions on Pattern Analysis and Machine Intelligence, vol. 20, No. 1, pp. 39-41, Jan. 1998.

Vemuri, B., et al., "Multiresolution Adaptive K-means Algorithm for Segmentation of Brain MRI," Image Analysis Applications and Computer Graphics, Third International Computer Science Conference, ICSC '95. Proceedings Springer-Verlag Berlin, Germany, pp. 347-354, 1995.

Wang, X., et al., "Improving fuzzy c-means clustering based on feature-weight learning," Pattern Recognition Letters, North-Holland Publ. Amsterdam, NL, vol. 25, No. 10, Jul. 16, 2004.

Yeung, D., et al., "Improving Performance of Similarity-Based Clustering by Feature Weight Learning," IEEE Transactions on Pattern Analysis and Machine Intelligence, IEEE, New York, NY, vol. 24, No. 4, pp. 556-561, Apr. 2002.

European Search Report from EP 06 12 2899, filed on Oct. 25, 2006.

\* cited by examiner (a)                                                 (b)

$n^1$ neighbourhood system clique types in $n^1$ $n^2$ neighbourhood system clique types in $n^2$

METHOD FOR SEGMENTING DIGITAL MEDICAL IMAGE

RELATED APPLICATIONS

This application claims priority to European Patent Application No. EP 06122899.5 filed on Oct. 25, 2006, and claims the benefit under 35 USC 119(e) of U.S. Provisional Application No. 60/862,894, filed on Oct. 25, 2006, both of which are incorporated herein by reference in their entirety.

BACKGROUND OF THE INVENTION

The anatomy of the female breast changes over age. During the reproductive years, the breast consists mainly of ductal, glandular, and fat tissue. This is interspersed with fibrous tissue providing support and attachment to the chest wall. Glandular and fibrous tissue are jointly called the fibro-glandular tissue. The breast glandular tissue is called the breast parenchyma and consists of 20 . . . 25 lobules (glands), responsible for milk production and are drained towards the nipple by numerous tiny tubes (ducts) that come together to form bigger ducts. Each milk-producing lobule contains a cluster or ring of cells. The sections of lobules and ducts are surrounded by fat for protection, and supported by the fibrous tissue. With age, ductal and glandular elements undergo atrophic changes and are increasingly replaced by fatty tissue. The breasts are held in place by ligaments that attach the breast tissue to the muscles of the chest. Breasts are covered by ordinary skin everywhere except the nipple and the aureoles around it.

The fibrous, ductal and glandular tissues appear as dark or "dense" on the X-ray mammogram. Fat, on the other hand, has a transparent, or lucent, appearance. The terms mammographic density (MD) and mammographic pattern are widely used to describe the proportion of dense/lucent areas in the breast presented on the mammogram. In the past, different methods of classification of mammographic parenchymal patterns have been proposed such as the Nottingham classification (5 patterns such as Normal (N), Glandular (G2, G1, G0), Dysplasia (DS-slight, DM-moderate, DY severe), prominent ducts (P1, P2) and indeterminate (IND)), Wolfe classification (4 categories) and Tabar-Dean classification (5 patterns).

Two major categories of breast cancer are lobular and ductal carcinoma.

Lobular carcinoma in situ (LCIS) is a condition of sharp increase of the number, appearance, and abnormal behavior of cells contained in the milk-producing lobules of the breast. The term "in situ" refers to an early stage of cancer and is used to indicate that abnormal cancer cells are present but have not spread past the boundaries of tissues where they initially developed. Though LCIS is not considered a cancer, women who are diagnosed with LCIS (also called lobular neoplasia) are at a higher risk of developing breast cancer later in life.

Ductal carcinoma in situ (DSIC) is the most common condition of early cancer development in the breast. Again "in situ" describes a cancer that has not moved out of the area of the body where it originally developed. With DCIS, the cancer cells are confined to milk ducts in the breast and have not spread into the fatty breast tissue or to any other part of the body (such as the lymph nodes). DCIS may appear on a mammogram as tiny specks of calcium (called micro-calcifications).

Both LCIS and DCIS may develop into invasive cancers (infiltrating lobular carcinoma or infiltrating ductal carcinoma) where cancer spreads into the fatty breast tissue or to any other part of the body (such as the lymph nodes), called metastases.

Mammography has become by far the most used and the most successful tool in the detection of early symptoms of breast cancer, which can often be signalled by the presence of micro-calcifications or masses. However, visual analysis—as performed by radiologists—remains a very complex task and many Computer-Aided Detection/Diagnosis (CAD) systems have been developed that support their detection and classification. Indeed, the impact of a CAD system on the detection efficiency of an experienced and respectively non-experienced radiologist has been investigated e.g. in (C. Balleyguier, K. Kinkel, J. Fermanian, S. Malan, G, Djen, P. Taourel, O. Helenon, Computer-aided detection (cad) in mammography: Does it help the junior or the senior radiologist?, European Journal of Radiology 54 (2005) (2005) 90-96. In both cases the CAD system has proven an effective support tool for the detection, though, its autonomy remains in doubt. Therefore, due to the complexity of the problem, automatic or semi-automatic systems still play only the role of a signalling tool for the radiologist.

In the CAD environment, one of the roles of image processing would be to detect the Regions of Interest (ROI) that need further processing for a given screening or diagnostic application. Once the ROIs have been detected, the subsequent tasks would relate to the characterization of the regions and their classification into one of several categories.

A classification system for mammographic lesions is offered by the American College of Radiology and is known as the B-RADS (Breast Imaging Reporting and Data System); apart from X-ray mammography, sections are included on ultrasound and magnetic resonance imaging (MRI) of the breast. The features that describe mammographic findings are illustrated by a line drawing depicting the feature, followed by several mammographic examples.

Examples of ROIs in mammograms are (a) calcifications, (b) tumors and masses, (c) the pectoral muscle, (d) the breast outline or skin-air boundary. Segmentation is the process that divides the image into its constituent parts, objects or ROIs. Segmentation is an essential step before the detection, description, recognition or classification of an image or its constituent parts, i.e. mammographic lesions, can take place.

A radiation image such as a mammogram typically consists of three main areas:

The diagnostic area comprises pixels corresponding to patient anatomy i.e. the breast. In general, the outline of this imaged area may take any shape.

The direct exposure area is the image region that has received un-attenuated radiation. Although this region has constant intensity corrupted by noise only, in-homogeneities in incident energy (e.g. X-ray source Heel effect) and receptor (e.g. varying storage phosphor sensitivity in computed radiograph may distort this pattern. In European patent application 1 256 907 a method is disclosed to estimate these global in-homogeneities retrospectively from the diagnostic image and flatten the response in all image parts in accordance with an extrapolated background signal.

The collimated areas—if any—appear on the image as highly attenuated pixels. The shape of these areas typically is rectilinear, but circular or curved collimation shapes may be applied as well.

Between these main areas in a radiation image, three different area transition types may be considered: diagnostic/direct exposure, diagnostic/collimated area, and direct exposure/collimated area boundaries.

Segmentation algorithms aim at detecting and separating of the set of pixels that constitute the object(s) under analysis. These techniques may be broadly classified according to the type of processing applied to the image. Region-based algorithms group pixels in the image according to suitable similarity criteria. In European patent application EP887 769 a region-based algorithm is disclosed to segment direct exposure areas by grouping pixels according to centroid clustering of the grey value histogram. Edge-based algorithms separate image pixels in high contrast regions in the image according to grey value differences of neighboring regions. In European patent application 610 605 and European patent application 742 536 an edge-based algorithm is disclosed to detect and delineate the boundaries between collimated areas and diagnostic areas on a single or multiply exposed image. Either in region-based and edge-based approaches, models may be used to restrict the appearance or shape of the segmented image areas to obey predefined photometric or geometric constraints. Examples of this paradigm are the so-called Active Appearance and Active Shape Models (AAM and ASM).

SUMMARY OF THE INVENTION

Because an analysis of the inner breast region is aimed at, neither of these techniques are applicable as (a) they are overall segmentation techniques not adapted to the specific content of breast structures and lesions and only yielding major entities such as the breast outline, or (b) assume specific geometric or photometric constraints that are not applicable to the large variability of mammographic appearance of breast structures and lesions. Therefore, here, the focus goes to techniques that reliably segment the structures and densities inside the breast skin outline.

The detection step, relying on the segmentation step is generally considered to be a very complex task. For example, masses are groups of cells clustered together more densely than the surrounding tissue and can be represented on a mammogram by a relatively small intensity change. Furthermore, a mammographic scan records all the structures present in a breast, the structures of which vary in size, homogeneity, position and medical significance. Finally, digital mammography, by its very nature, is inherently characterized by the error introduced as a result of the conversion between real-world and the digital representation, i.e., the quantization noise. All these three factors increase the complexity of the task of breast cancer diagnosis.

The present invention relates to a contextual segmentation method of digital medical images such as mammograms.

It is an object of the present invention to provide a method of segmenting a digital medical image which deals with the general inhomogeneity of a digital mammogram that in particular hampers a useful segmentation.

The basic assumption in the present invention when using the pixel grey value as local image feature is that the image consists of regions having substantially uniform grey value.

In case of an image which, does not consist of regions of substantially uniform grey value multi-dimensional features are preferably used such as multi-dimensional features calculated on the basis of a filter bank of local derivatives.

In general, a clustering scheme divides an input set (an image with its intensity values) into a set of groups—called clusters—by assigning a value, which represents a class, to each pixel. The goal of efficient clustering is to emphasize the boundaries between the objects present in the image, regardless of the size, position or level of visibility. One of the most investigated and well known techniques of clustering is K-means as described in general textbooks such as R. O. Duda, P. E. Hart, D. G. Stork, Pattern classification, John Wiley and Sons, Inc., 2001. The behavior and deficiency of this technique is discussed in the context of mammogram analysis.

According to the present invention a Markov Random Field mode is developed and is applied as an extension to the general K-means method. It is shown how the introduction of a simple dependency factor significantly improves the outcome.

Below the K-means scheme is described and the MRF algorithm is introduced. Main applications on mammographic data analysis are exemplified. The detailed definition of the MRF-based clustering model according to the present invention is disclosed along with its parameters and characteristics. Finally, the results achieved by the algorithm with regard to the detection of micro-calcifications and masses is commented and compared with the outcome of the classical K-means routine.

In general, according to one aspect, the invention features, a method for segmenting a digital medical image comprising the steps of computing an initial segmentation class label for each pixel on the basis of a K-means clustering algorithm and computing associated class centroids and gamma functions; a gamma function weighting the importance of likelihood potential and clique potential in an energy function. An energy measure is computed for a current pixel associated with assigning each label in turn to the pixel. The energy measure is a sum of two components: a measure of the distance between the pixel's feature value and the value of the centroid indicated by the current segmentation label; and a measure of the difference of the assigned label and the label of at least one neighboring pixel.

The label is selected for the current pixel yielding the lowest energy and the segmentation class centroids and gamma functions are recalculated. The method proceeds to the next pixel until all pixels in the image are visited. These steps are repeated until the class labels of the image pixels do not change so as to yield the final segmentation of the image.

In general, according to another aspect, the invention features, a method for segmenting a digital medical image comprising the steps of computing a multi-resolution (MR) representation of the digital image, selecting an image at a coarse resolution level in the MR representation as initial image and applying a K-means clustering algorithm to the initial image and computing an energy measure for a current pixel associated with assigning each label in turn to the pixel. The energy measure is a sum of two components: a measure of the distance between the pixel's feature value and the value of the centroid indicated by the current segmentation label; and a measure of the difference of the assigned label and the label of at least one neighboring pixel. The label is selected for the current pixel yielding the lowest energy and the segmentation class centroids and gamma functions recalculated. The method proceeds to the next pixel until all pixels in the image are visited. The steps are repeated until the class labels of the image pixels do not change so as to yield the final segmentation of the image. The labels are propagated to the next finer resolution level of the multi-resolution representation and the steps repeated until the original image is segmented.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

A new pixel clustering model is disclosed here and applied to the analysis of digital mammograms. The clustering represents the first step in a more general method of mammographic analysis and aims at the creation of a concise data-set (clusters) for automatic detection and classification of mammographic structures such as the pectoral muscle and the breast outline on the one hand and lesions such as masses and micro-calcifications on the other hand. The lesions are typically the first symptoms analyzed in early diagnosis of breast cancer. The image pixels are described by their intensity (grey level) or a multi-dimensional feature vector. Multidimensional decompositions may be obtained by applying multi-scale filter banks or texture operators.

A Markov Random Field (MRF)-based technique is introduced that is suitable for performing clustering of images characterized by poor or limited data. The proposed method is a statistical classification model that labels the image pixels based on the description of their statistical and contextual information. Apart from evaluating the pixel statistics that originate from the definition of the K-means clustering scheme, the model expands the analysis by the description of the spatial dependence between pixels and their labels (context), hence leading to the reduction of the inhomogeneity of the segmentation output with respect to the result of pure K-means clustering.

Mammographic Data

A mammographic exam, called a mammogram, is used as a screening tool to detect early breast cancer in women experiencing no symptoms and to detect and diagnose breast diseases in women experiencing symptoms such as a lump, pain or nipple discharge. One of the anomalies that cannot be felt but can be seen on a mammogram and signals a possible cancer development is the presence of micro-calcifications which are build-ups of calcium in the breast tissue. The sizes of micro-calcifications vary from 0.1 millimeters (mm) to 5 mm and on a mammogram the groups of calcium appear as small spots surrounded by a darker, inhomogeneous background. Another important group of anomalies that signals a possible cancer development is the presence of masses which are build-ups of dense cells in the breast tissue. On a mammogram the groups of cells appear as bright regions surrounded by a darker, inhomogeneous background.

As with all X-ray images the mammographic images are corrupted by noise sources of various natures, such as (a) acquisition noise due to the discrete character of the X-ray photon flux, (b) digitization noise due to the limited range of quantization bins and (e) anatomic noise due to the superposition of anatomic structures in a projection image. Hence image regions on a mammogram are inherently inhomogeneous and affected by the combined effect of these noise sources.

Figure 1:
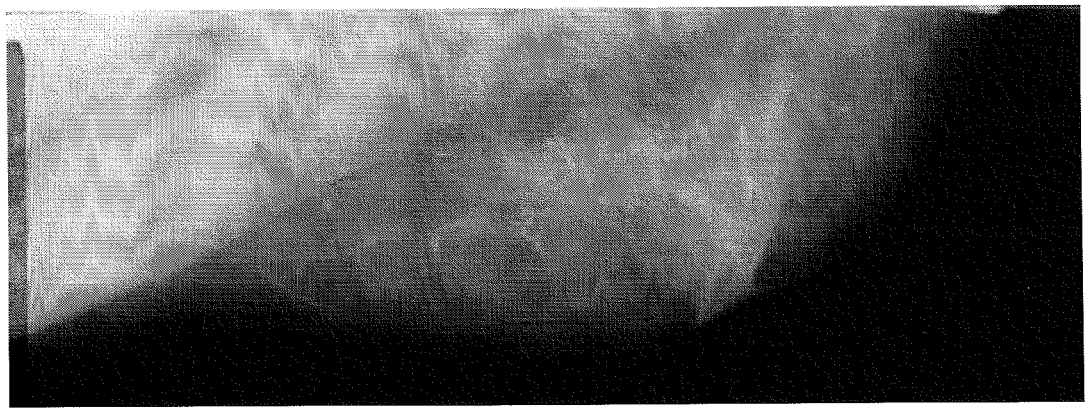
FIG. 1 is an example front the MIAS database with (a) microcalcifications and (b) indicated mass.
Figure 1:
Figure 2:
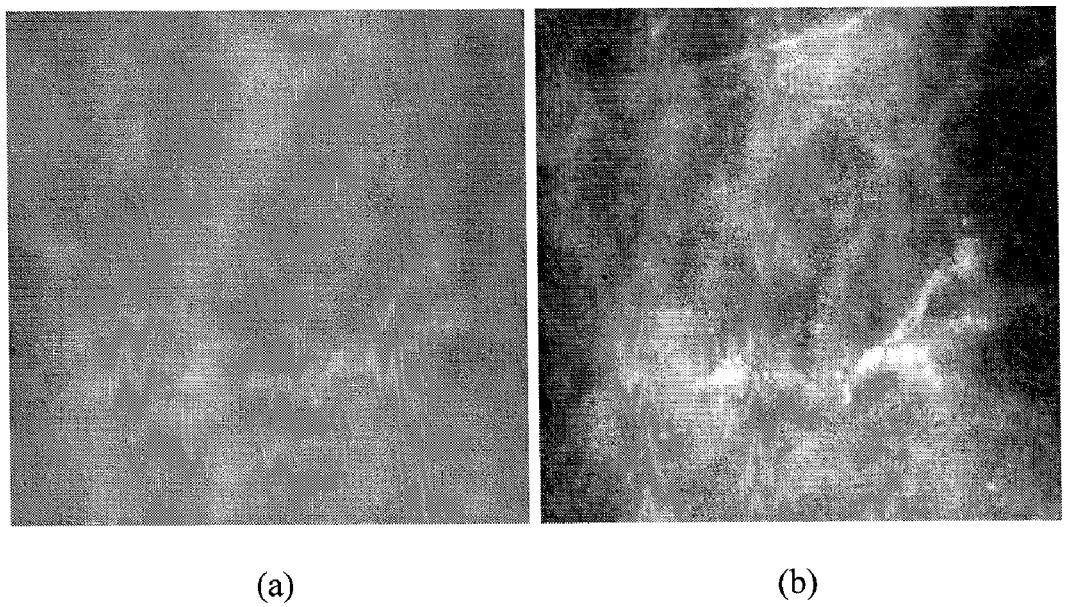
FIG. 2 is a magnified fragment of FIG. 1 (a) where micro-calcifications occur (a), and its histogram equalized version (b)

FIG. 1 (a) is a reduced in size example mammogram from the publicly available MIAS (Mammographic Image Analysis Society) database. The presented image is a case of occurrence of micro-calcifications; however, the size of the anomalies is too small to be easily identified. It is easier to identify the calcium liaisons on FIG. 2 (a), where only a fragment of the same mammogram is presented. It remains difficult to identify boundaries between the actual micro-calcifications and the surrounding tissue. Even the histogram equalized version, FIG. 2 (b), of the same fragment does not allow segmenting the structures easily. FIG. 1 (b) is a case of occurrence of a mass, indicated with a drawn ring. The difficulty remains in the identification of the boundaries between the actual mass and the surrounding tissue.

K-Means Statistical Data Clustering

Figure 3:
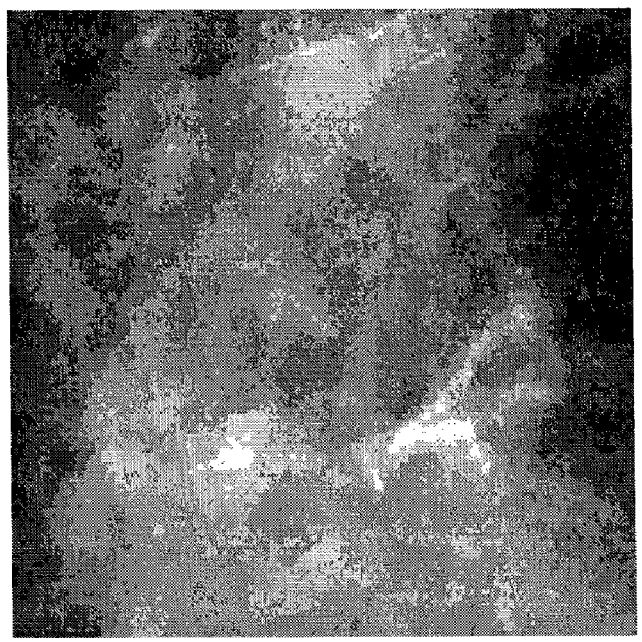
FIG. 3 illustrates K-means clustering with 5 classes.

Clustering of numerical data forms the basis of many classification and modelling algorithms. The purpose of the clustering is to identify natural groupings of data from a large data set to produce a concise representation of a system's behavior. The K-means routine, divides the input set into K clusters according to the data provided about the entities. The K-means clustering principle is introduced in basic textbooks on pattern recognition such as R. O. Duda, P. E. Hart, D. G. Stork, Pattern classification, John Wiley and Sons. Inc., 2001. The data may be represented by one point per entity in a feature space, based on the pixel's grey value for example, or it may be a multidimensional feature space, based on a multi-scale filter bank decomposition or a set of texture descriptors. At the start, K class centroids are defined and each point is assigned a class, to which centroid its description is the "closest". Each assignment is followed by the recalculation of the centroid among points belonging to the class. The clustering repeats the assignment in an iterative manner until the sum of distances between all points and their respective class centroids is minimized. FIG. 3 presents a result of division of the image pixels into 5 classes by applying the K-mean scheme and providing the grey level as the description of the pixels.

It is clearly visible that the spatial inhomogeneity of the input image has strong impact on the shape and inconsistency of the resulting set of clusters. It is a known drawback of the K-means clustering routine that it uses no spatial constraints and assumes that each cluster is characterized by a constant intensity. The latter assumption is seldom true and holds also for mammographic images. A semi-solution to reduce the problem can be achieved by incorporating the coordinates of the pixels in the used data together with the grey level value. However, in such case, K-means divides the image into K spatially distinct clusters, which is highly undesirable. A very high number of classes can also be defined to satisfy the requirements of the mammogram clustering. It would, however, highly increase the complexity of the output Modeling with Markov Random Fields The MRF theory provides a statistical tool for vision problems constructed within the Bayesian framework, incorporating structural and statistical information. MRF theory was introduced in the open literature by S. Geman, D. Geman, Stochastic relaxation, Gibbs distribution, and the Bayesian restoration of images, IEEE Trans. on Pattern Analysis and Machine Intelligence Vol. 6 (1984) 721-741.

Clustering is defined as pixel labelling, however, for the purpose of consistency with the theory in the aforementioned publication, the pixels are called sites.

A set of sites $S=\{1, \ldots, n\}$ represent the primitive objects which are labelled e.g. pixels. The label assignment to all sites is defined as a realization of a family of random variables defined on S and denoted $\{X=x\}=\{X_1=x_1, \ldots, X_n=x_n\}$ (for simplicity we note $x=\{x_1, \ldots, x_n\}$). The feature space describing the sites is also treated as a random observation field with its realization $y=\{y_1, \ldots, y_n\}$. In general the set of observation vectors does not need to be of the same magnitude as the set of sites, for instance, when the observations are defined for pairs of sites. In the context of embodiments of the present invention, however, the number of observations is equal to the number of sites. For a supervised technique a training set of sites $S_{tr}$ is also defined. The training set in that case consists of previously extracted and labelled (often manually) primitives. The technique here is an unsupervised one. Therefore no training set for the clustering is defined. Finally, a label set $L=\{1, \ldots, m\}$ is denoted, where each label corresponds to a class. It is worthwhile to mention that the output may consist of a number of spatially distinct pixel clusters assigned the same label.

An optimal labelling in MRF satisfies the maximum a posteriori probability (MAP-MRF) criterion which requires the maximization of the posterior probability $P(X=x|Y=y)$ (hereafter denoted as $P(x|y)$) of the labelling that can be assumed to follow the Gibbs distribution of the following form:

$$P(x \mid y) = Z^{-1} \times e^{\frac{U(x|y)}{T}} \quad (1)$$

where the partition function Z is a normalizing constant, $U(x|y)$ is the posterior energy and T is the so-called system temperature and in most vision problems is assigned a value 1.

The Gibbs probability density function is incorporated in the decision function by using the simplified Hayes rule $P(x|y) \propto P(x)p(y|x)$ that leads to the following form:

$$P(x)p(y|x) \propto e^{-U(x)} e^{-U(y|x)} = e^{-(U(x)+U(y|x))} \quad (2)$$

hence, the posterior energy from Eq. 1 is now expressed as a sum of the prior—$U(x)$—and the likelihood—$UT(y|x)$—energy term:

$$U(x|y)=U(x)+U(y|x) \quad (3)$$

The Gibbs distribution model defines the labelling of a site i depending on the labelling of all the other sites in S. However, an important result known as the Hammersley-Clifford theorem established the one-to-one equivalence between a Gibbs Random Field (GRF) and a Markov Random Field (MRF). A MRF model is a conditional probability model where the probability of a site label is dependent on the site labels within a given neighborhood only. Given the notations from the beginning of the section, the neighborhood system for S is given by $N=\{N_i|i \epsilon S\}$, where $N_i$ is a collection of all sites neighboring i excluding i.

$$P(x_i|x_{S-(i)})=P(x_i|x_{N_i}) \quad (4)$$

where $$x_{N_i}=\{x_{i'}|i' \epsilon N_i\} \quad (5)$$

This "localization" of the dependence term has an important impact on reduction of the complexity of the model. Sites being neighbors are grouped, in so-called cliques, which, depending on the desired complexity of the model, may consist of any number of neighboring sites. The order of a clique indicates the number of included sites and its increase usually adds up to the complexity of the description of the model as well as to its computational complexity.

Here unary cliques—of the first order—which include one site {i} and binary ones—of the second order—which include a pair of neighboring sites {i,i'} are defined. The energy can be estimated as a sum of local potentials defined on the cliques. Given the labelling of the sites, the clique potentials $V\{x_i\}$ and $V(x_i,x_{i'})$ of each clique and the likelihood potentials $V(y_i|x_i)$ are estimated, where i and i' index the sites in S.

The prior energy is the sum of all clique potentials:

$$U(x) = \sum_{i \in S} V(x_i) + \sum_{i \in S} \sum_{i' \in N_i} V(x_i, x_{i'}) \quad (6)$$

whereas the likelihood energy is the sum of all likelihood potentials under the assumption that the observations, conditioned by the labels $x_i$, are mutually independent:

$$U(y \mid x) = \sum_{i \in S} V(y_i \mid x_i) \quad (7)$$

Deriving from Eq. (1) the MAP-MRF solution is achieved by minimizing the energy as defined in Eq. (3):

$$\hat{x} = \underset{x}{\operatorname{argmin}} U(x \mid y) \quad (8)$$

Finding the global minimum of the energy is a combinatorial problem, which is usually carried out using the deterministic Iterated Conditional Mode algorithm (ICM) as introduced in J. Besag, Spatial interaction and the statistical analysis of lattice systems, J. Royal. Statistical Society Vol. 36 (1974) p. 192-226, or the stochastic Simulated Annealing (SA) algorithm as introduced in S. Geman, D. Geman, Stochastic relaxation, Gibbs distribution, and the Bayesian restoration of images, IEEE Trans. on Pattern Analysis and Machine Intelligence Vol. 6 (1984) p. 721-741. The combinatorial character of the definition implies certain features of the model, which are described further on.

Ising Model

The Ising model is a special case of an auto-logistic model in MER called also multi-level logistic (MLL) model. It is expressed as a simple constraint defined on the neighboring sites. A situation when the neighboring sites i and i' are assigned two different labels is "penalized" by a small constant in the clique potential, thus enforcing homogeneity of the labelling; it can be expressed in the following form:

$$V(x_i, x_{i'}) = \begin{cases} \beta, & x_i \neq x_{i'} \\ -\beta, & x_i = x_{i'} \end{cases} \quad (9)$$

where $\beta$ is a small positive constant. The simplicity of the Ising model implies ease in including certain constraints on the labelling process. A priori known information can be encoded in the model in order to enforce required behaviour (general (in)-homogeneity, directional (in)-homogeneity, texture parameters, ... ).

General Flow of Operations

Figure 11:
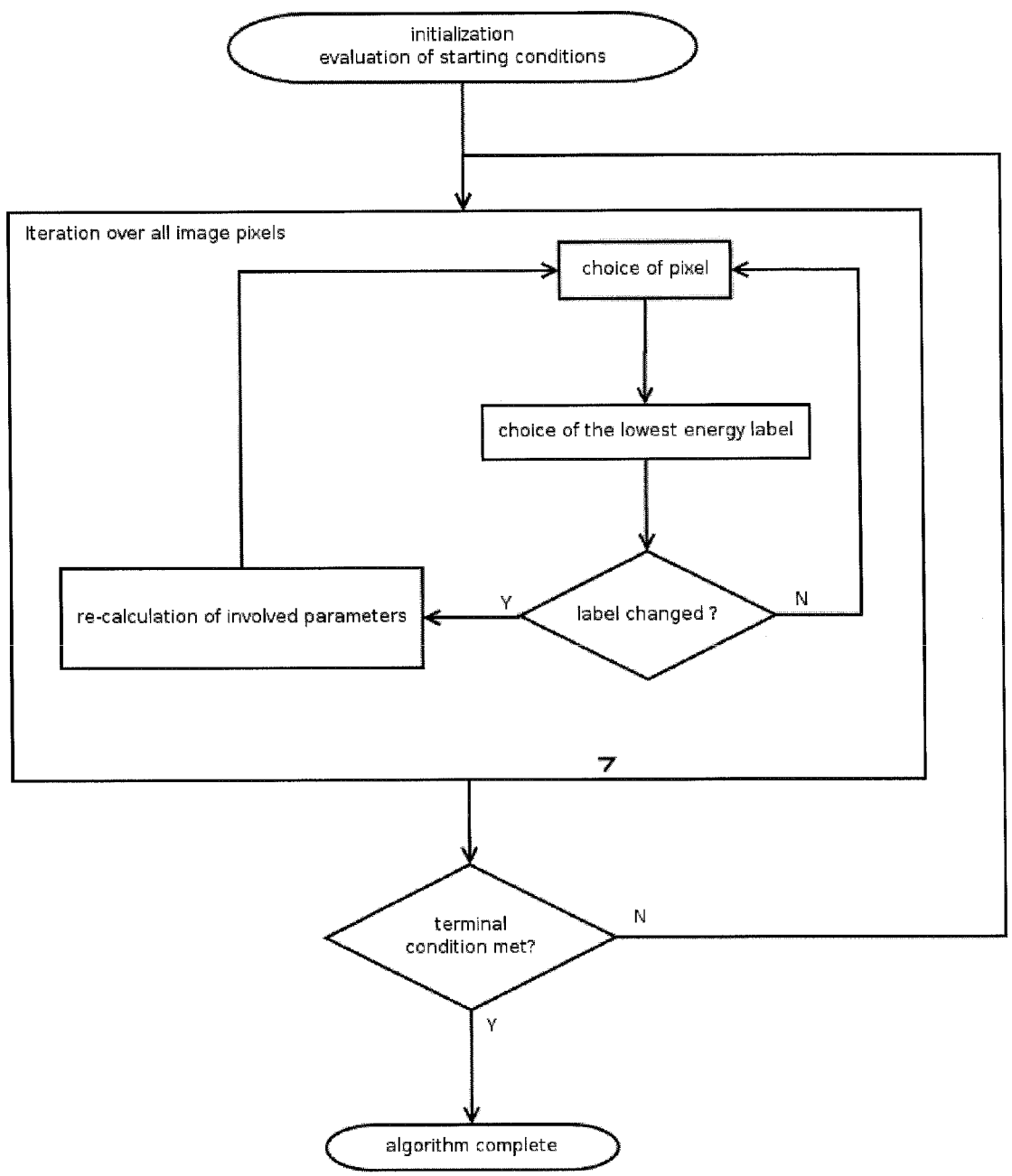
FIG. 11 is a general block diagram of operations of the Markov Random Field clustering (MRFC) method.

FIG. 11 shows a diagram with general flow of operations, comprised of the following steps:

Initialization and Evaluation of the Starting Conditions.

The process of initialization includes calculation of the positions of the class centroids and their respective values of the $\gamma$ functions.

Iteration over all image pixels. The type of iteration is dependent on the chosen sampling scheme, of which several possibilities exist. Two cases of particular importance are:

ICM—Iterated Conditional Modes. In this algorithm pixels are visited along an ordered list of the pixels. The list is traversed from the beginning till the end and from the end till the beginning. The labels in this scheme are also ordered and the algorithm evaluates energy for each of them in turn.

After visiting all the pixels, the terminal condition is evaluated.

The advantage of application of the ICM algorithm to mammogram analysis is that, once correctly initialized, it will assign higher labels to brighter regions, thus automatically providing useful information for the further analysis of the segmented regions.

SA—Simulated Annealing. The algorithm chooses a pixel randomly in the image. Then a label is chosen randomly as well and the energy is evaluated for the randomly chosen label and the current label of the pixel only.

Simulated Annealing requires significantly higher number of iterations. The advantage of the SA algorithm is attributed to the fact that it can avoid the segmentation to be trapped in local minima. The drawback may be that SA can swap labels between higher and darker regions, thus reducing the meaning of the labels when applied to mammogram processing.

Recalculation of the class parameters: Each label change triggers recalculation of two class centroids and the respective $\gamma$function values. The choice of the two classes requiring recalculation is determined by the current label and the newly assigned pixel label.

Terminal condition: The algorithm evaluates the number of pixels which have changed their labels during a single iteration. The iterations are repeated until none of the image pixels changes its label anymore. The final segmentation of the mammogram consists of the image regions corresponding to each of the labels.

One of the difficulties of the design of a clustering scheme is the choice of the number of classes. Some routines are designed to cluster into as low number of classes as possible with minimal loss of information. In the present case, however, the as-few-as-possible approach would not yield the desired results due to the character of mammograms. In a very simple way, the process of searching for masses on mammograms could be described as a search for brighter regions of a very big lattice. Moreover, the occurrence of the searched objects is not evident and usually their visual features are very similar to the background. Indeed, a slight difference in intensity is the first salient characteristic and it is generally known that masses form slightly brighter regions within the breast tissue. In the present case the data are represented by a set of intensity images with 12-bit depth, therefore, the data is characterized by relatively low resolution. Nonetheless, a coherent and relatively simple MRF model has been designed that overcomes the problem and performs an effective clustering.

Let $S=\{1, \ldots, n\}$ be a set of sites, i.e., pixels, where each pixel i in is described by its grey level value $y_i$. The set of random variables representing the assignment of the labels to each pixel is denoted $x=\{x_1, \ldots, x_n\}$ and is a so-called configuration. Since, as shown in the previous section, the label assignment process is partially dependent of the labels themselves, the configuration x expands the model description. Finally, we define a label set $L=\{1, \ldots, m\}$ where each index represents a class that is a sub-region in one-dimensional grey level feature space.

Neighborhood System and Cliques

Figure 9:
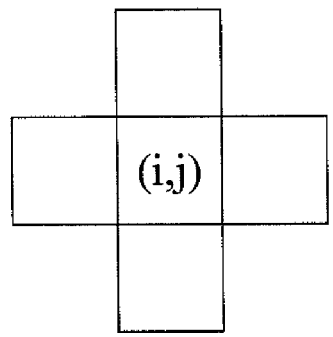
FIG. 9 shows an $n^1$ neighborhood system and clique types in $n^1$.
Figure 9:
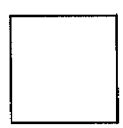
Figure 9:
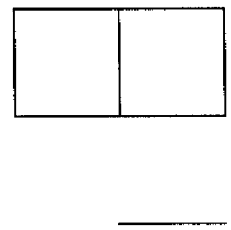
Figure 9:
Figure 10:
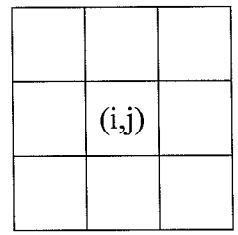
FIG. 10 shows an $n^2$ neighborhood system and clique types in $n^2$.
Figure 10:
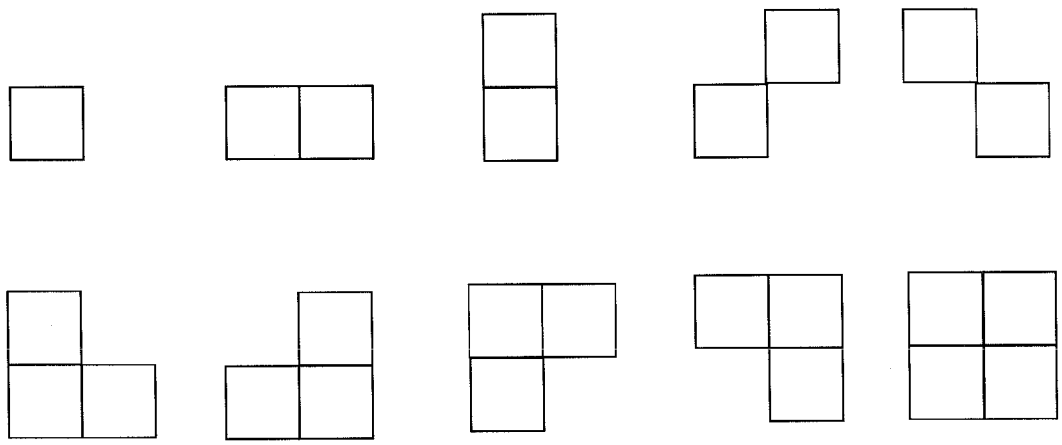

The application of embodiments of the present invention deals with discrete random fields defined over a finite $N_1 \times N_2$ rectangular lattice of image pixels as $L=\{(m,n):1 \leq m \leq N_1, 1 \leq n \leq N_2\}$. A collection of subsets of pixels of the lattice L is a neighborhood system on L if and only if the neighborhood $\eta_{nm}$ of a pixel comprises pixels only pixels (k,l) that are neighbors of (i,j). Hierarchically ordered sequences of neighborhood systems are used here. The nearest neighbor model, also known as the first order neighborhood system uses the closest four neighbors of each pixel, the second order model used all eight neighbors. A clique c associated with a lattice-neighborhood pair $(L,\eta)$ is defined as a subset of L such that either C consists of a single pixel $c=\{i\}$, or of a pair of neighboring sites $c=\{i,i'\}$ or a of a triple of neighboring sites $c=\{i,i',i''\}$ and so on. These neighborhood systems and their associated cliques are depicted in FIG. 9 and FIG. 10.

Together with their controlling parameters assigned to each clique type, the behavior of the segmentation can be steered: the parameter of the single clique sites steers the percentage of pixels in each region type in the image; the parameters of the cliques involving more than one site control the size and the direction of the clustering.

Initial Labeling

The efficiency of an MRF-based routine is often dependent on the starting point. In this application, the scheme is defined as a deterministic process; therefore, there exists a danger of converging into a local minimum, which does not represent the MAP-MRF solution. Therefore, the initial labelling is performed by assigning to each pixel a class, to which centroid its grey level is the closest. The resulting image is a scattered set of labels on which it is easy to see the influence of the present noise and inhomogeneity (see FIG. 3). For simplicity, we divide the one-dimensional feature space into equally-sized regions and place the class centroids in the centers of the regions, i.e. the centroids are uniformly spread along the feature space. The initial labelling produces a dithered image according to the predefined number of classes. It is worth noticing at this point that the initial labelling is equivalent to the result of the first iteration of the K-means algorithm.

Energy Function

In the problem at hand, the energy function plays a two-fold role. It has to lead the routine to assign to pixel i a label which points to its class with respect to the pixel's intensity value, thus its distance from the class centroid, on one hand. On the other hand it has to lead the routine to group neighboring pixels in consistent, spatially homogeneous clusters.

Relating to the basic energy form described in Sec. 2.3 and presented in a simple form in Eq. (3) the likelihood energy is defined as a sum of likelihood potentials. In this application, the potential represents the pixel's Euclidean distance from the class centroid, yielding:

$$V(y_i|x_i) = \|y_i - C_{x_i}\| = |y_i - C_{x_i}| \quad (10)$$

where $C_j$ is the value of the centroid of the class j. The defined likelihood potential leads to the correct assignment of the labels, nonetheless, it results in spatial incoherence due to the noise present in the mammogram. If the clique potentials are not defined (V(x)=0), the labeling in the presented form is equivalent to K-means with Euclidean distance chosen as the distance measure. The result achieved by this routine is presented in FIG. 3.

The clique potential defined in Eq. (9) represents the second role of the energy function. This component is responsible for removing spatial incoherence from the labelling. The only information it uses is the actual labelling of a pair of neighboring pixels and takes a modified Ising-like form as given in S. Z. Li, Markov Random Field Modelling in Computer Vision, Springer Verlag, 1995:

$$V(x_i, x_{i'}) = \begin{cases} 0, & x_i = x_{i'} \\ 1, & x_i \neq x_{i'} \end{cases} \quad (11)$$

The potential "discourages" the routine from assigning different labels to two neighboring pixels.

General Form of the Energy Function and Normalizing Parameters

The problem combining the two defined types of potentials arises from different value ranges. The range of the likelihood potential is dependent on the number of classes, the size of the grey level domain and the positions of the class centroids, whereas the range of the clique potential depends on the size of the neighborhood system. Therefore, in an attempt to normalize the potentials, two parameters α and β are introduced to balance (normalize) the energy function. In fact, with these two parameters the model's behavior can be adjusted in terms of preference assigned to the types of potential. The energy form from Eq. (3) was modified by extending it as follows:

$$U(x|y) = \alpha \sum_{i \in S} V(y_i|x_i) + \beta \sum_{i \in S} \sum_{i' \in N_i} V(x_i, x_{i'}) \quad (12)$$

The form presented above assumes that the parameters α and β are constant. However, in the following sections it is shown that they need to be recalculated together with the class centroids. The function of the two parameters has been described before. Their impact on the algorithm is to balance out the routine in terms of the desired behavior and lead it to convergence. They influence the behavior of the routine between extremes according to two special cases:

α=0 and β>0

Since the value of β is equal in all directions when using an isotropic neighborhood (e.g. 3×3 neighborhood), the resulting set of labels will consist of only one label. The label which occurs the most in the initial labelling spreads across the lattice.

α=0 and β=0

Only the likelihood potential is evaluated and the labelling scheme reduces to the classical K-means algorithm.

The values α and β have direct impact on the actual global minimum of the energy function. Manual setting for the two parameters can force the model to present certain behavior (enforce homogeneity, minimize the distances between the pixels values and their respective class centroids . . . ). The parameters may be set in such a way that "importance" of the two respective potentials is balanced, i.e., they are approximated depending on the ranges of the potentials in order to make the two equal in an attempt to normalize the potentials. Within a class, i.e., in the set of pixels assigned to one class we define the maximum occurring distance in the grey level domain:

$$MaxDist(y_i|x_i) = \max_{j,x_j=x_i} |y_j - C_{x_i}| \quad (13)$$

Having defined the maximum possible distance α is calculated as follows:

$$\alpha(y_i|x_i) = MaxDist(y_i|x_i)^{-1} \quad (14)$$

It is evident that this definition of the parameter implies its dependence on the positions of the class centroids, hence, the requirement to recalculate when the centroids shift their positions.

The parameter β is calculated in a similar fashion; only the domain of the clique potential is depending on the assumed neighborhood system. Since we have defined the neighborhood system as an 8-neighborhood, the maximum occurs when a pixel i with a label $x_i$ is surrounded by 8 pixels with labels different from $x_i$. Therefore, we calculate:

$$\beta = 8^{-1} \quad (15)$$

The 8-neighborhood ensures isotropy in re-assigning the labels; directionality can be built in by considering oriented cliques as given in FIG. 9 and FIG. 10.

Modified Energy Function

As shown in previous section the parameter β is constant, therefore, it can be removed from the equation by the following substitution:

$$\gamma(y_i|x_i) \frac{\alpha(y_i|x_i)}{\beta} \quad (16)$$

In Eq. (12) α is also constant, but it may be shown that its value follows the label assignment, and moreover, it needs to be evaluated per class. The reason arises from the fact that while the class centroids change their positions, the ranges of the classes change as well, which implies that distances between pixels' intensities and the centroids follow the changes respectively. Since α has been defined as a normalization parameter for the within-class distance measure it has to be recalculated together with the class centroid and since the newly defined parameter γ is a function of the assigned label and the feature describing a pixel, the energy function takes the modified form:

$$U(x \mid y) = \sum_{i \in S} \gamma(y_i \mid x_i) V(y_i \mid x_i) + \sum_{i \in S} \sum_{i' \in N_i} V(x_i, x_{i'}) \qquad (17)$$

The values of the class centroids and the values of the γ's are recalculated at the same time; moreover, following the definition of K-means, the recalculation takes place after each assignment of a label to a pixel.

The routine iterates along the image according to the ICM sampling scheme as introduced in J. Besag, Spatial interaction and the statistical analysis of lattice systems, J. Royal Statistical Society, Vol. 36 (2974) p. 192-226. In each iteration, each pixel is visited and its energy is evaluated for each label available in S. A label yielding the lowest energy is chosen as explained next, the respective class centroids and the functions γ( . . . ) are recalculated and the algorithm proceeds to the next pixel. Finally, each iteration is followed by a count of pixels which have changed their label and the program terminates when the count result is lower than a pre-defined threshold.

Choice of the Lowest Energy Label

Figure 13:
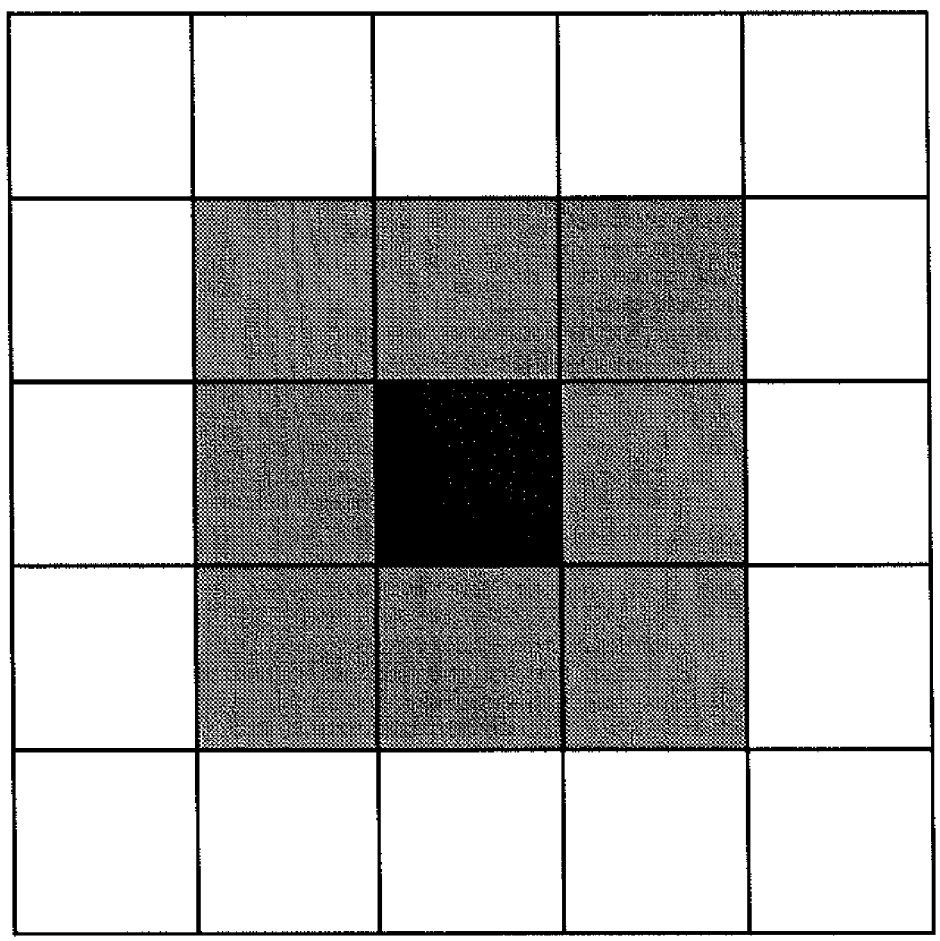
FIG. 13 shows a 3×3 neighborhood of a pixel.

By omitting the image loop in eq. (17), the energy of a label x of a single pixel i, characterized by an intensity value y, is estimated as a sum of two components:

$$U(x_i \mid y_i) = \gamma(y_i \mid x_i) V(y_t \mid x_i) + \sum_{i' \in N_i} V(x_i, x_{i'})$$

where $V(y_i|x_i)$ is the likelihood potential weighted by the function $\gamma(y_i|x_i)$ and $V(x_i,x_{i'})$ is the clique potential. $N_i$ is a list of indexes of the neighboring pixels as drawn in FIG. 13, representing pixel i drawn in black and its neighbors drawn in grey. $N_i$ is a list of indexes of these grey colored pixels.

The likelihood potential is a measure of the distance between the pixel's intensity value and the value of the centroid indicated by the actual label $x_i$.

The clique potential is a sum of so-called penalty values and takes value one if the pixels i and i' it have been assigned different labels and zero otherwise. This is the novel contextual term in the current segmentation method in that labels of neighboring pixels influence the assignment of the new label of the current pixel. It is responsible for filling local gaps in the image of the segmentation labels, thereby reducing the fragmented appearance due to noise or anatomical variation of breast tissue. It thereby overcomes the drawback of classical segmentation methods such as the K-means algorithm.

All available labels are assigned in turn to the pixel i and the respective energies are estimated. The label yielding the lowest value of the energy is chosen and the pixel is assigned this label. Having chosen the "best" label the algorithm proceeds to the next pixel according to the order of visiting the pixels in the image.

Detailed Flow of Operations

Figure 12:
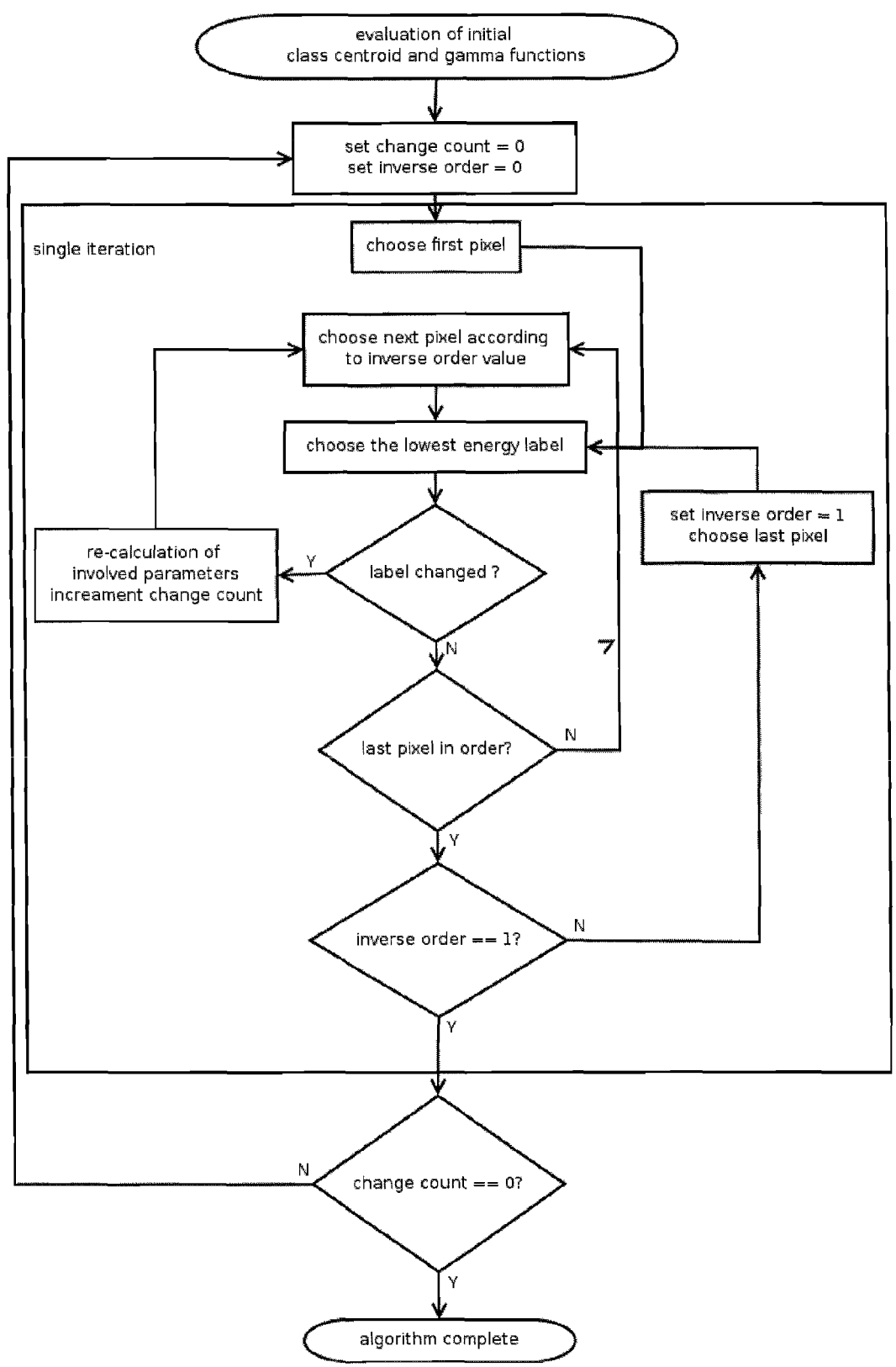
FIG. 12 is a detailed block diagram of operations.

The detailed diagram of FIG. 12 extends the general diagram of FIG. 11.

The value 'change order' forms the terminal condition for the algorithm. The algorithm concludes a stable labeling when during an iteration none of the image pixels has changed its label. It is set to zero before each iteration.

The value 'inverse order' steers the direction of an iteration. In the classical form, the ICM sampling scheme visits a set of ordered pixels from the first to the last one and then from the last to the first one. Once the image pixels have been visited 'back-and-forth', an iteration is concluded and the terminal condition is checked.

The decision whether 'change count' is equal to zero forms the terminal condition of the algorithm.

The process called 'choose the first pixel' has the meaning of choosing the first pixel in the order, i.e., the first pixel of the image when the 'inverse order' is assigned value zero and the last pixel of the image when 'inverse order' is set to one.

The process 'choose next pixel according to order' is also steered by the value of 'inverse order'. In case of zero, the algorithm shifts to the next pixel of the image, in case of one it proceeds to the previous pixel.

Behavior of the Model

The behavior of the model when applied on real images has been analyzed with respect to two aspects: (a) impact of the class centroid recalculation and (b) choice of the number of class parameter. These aspects are commented hereafter using representative examples of mammograms with micro-calcifications and masses.

Figure 4:
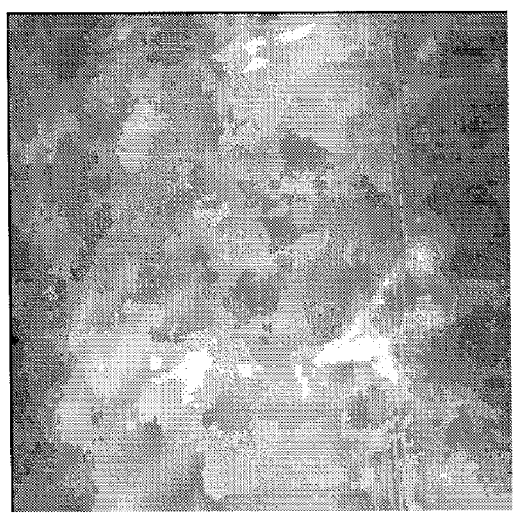
FIG. 4 shows the result of clustering with 10 classes and with (left) and without (right) centroid recalculation.
Figure 4:
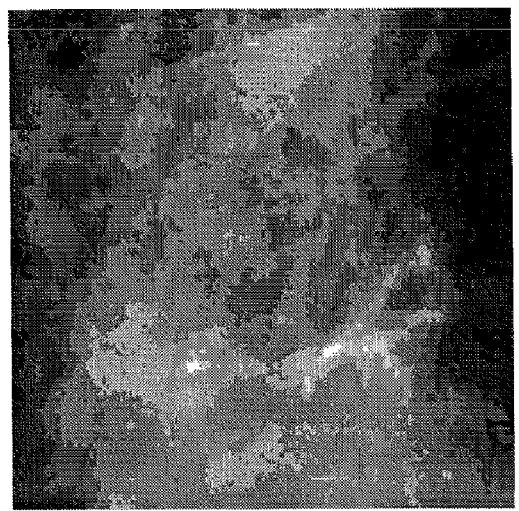

Centroid recalculation. Recalculation of the centroids following each label assignment has it source in the definition of K-means method. As shown before, the function γ also needs recalculation as a consequence of re-positioning of the centroids. However, when the centroids were set static and the recalculation was not performed, the final result (see FIG. 4) changes significantly. The algorithm without the recalculation converges in lower number of iterations, however, the result indicates lower homogeneity of the clustering and lower smoothness of the extracted pixel groups.

The centroid recalculation is a reason for another feature of the disclosed algorithm to arise. In some cases, it may happen that one of the classes will vanish from the image in the course of the labelling, which does not happen if the centroids are static. Indeed, the low density of the grey level domain and high number of sites, resulting from high dimensions of the mammograms, assures us that every class will have pixel members after the initial labelling. However, in progress, if the algorithm detects that a class has not got any members, i.e., there is zero pixels assigned to that class, it can not recalculate neither the centroid nor the function γ( . . . ). In such case the two parameters are re-set to the values resulting from the calculation after the initial labelling. Re-setting these values is justified by the fact that if a class disappears from the image the algorithm allows it to reappear again.

The number of classes. The parameter which is assigned manually to the algorithm is the number of classes. The experiments show that a number lower than 10 is satisfactory for clustering, which will not remove neither micro-calcifications nor masses from the final result. However, further analysis has been conducted to evaluate the minimal number of classes required to delineate these lesions.

Figure 6:
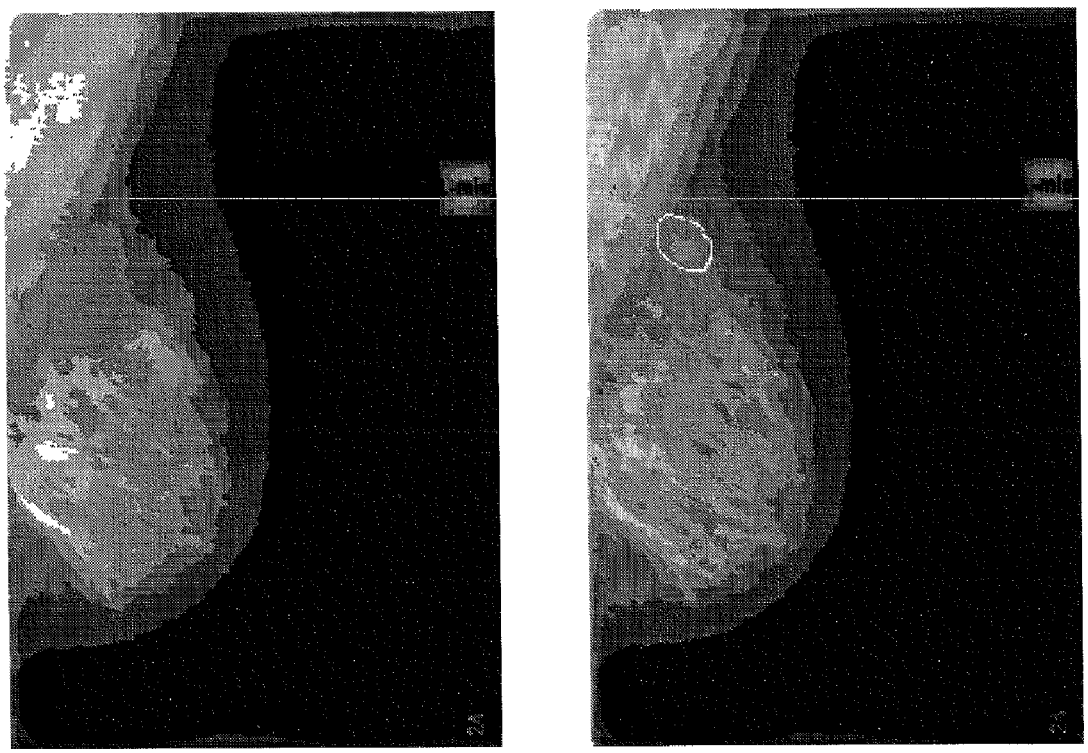
FIG. 6 is the result of clustering with 7 (left) and 8 (right) classes; the indicated region is a documented mass.

To this purpose, a set of images with documented masses was clustered, using 10 as the number of classes. The masses were always correctly delineated, that enables to calculate their grey level characteristics: the grey level range of the pixels belonging to masses covers around 1/7.5 of the range represented by 12-bits. Therefore it is established that 8 is a minimal number of classes required to correctly extract the mass boundaries. Indeed, FIG. 6 shows a result of clustering using 7 and 8 classes respectively. It is visible that clustering into 7 classes did not extract the suspicious region. However, 8 as the number of classes, on the other hand, did succeed to extract the mass.

Figure 5:
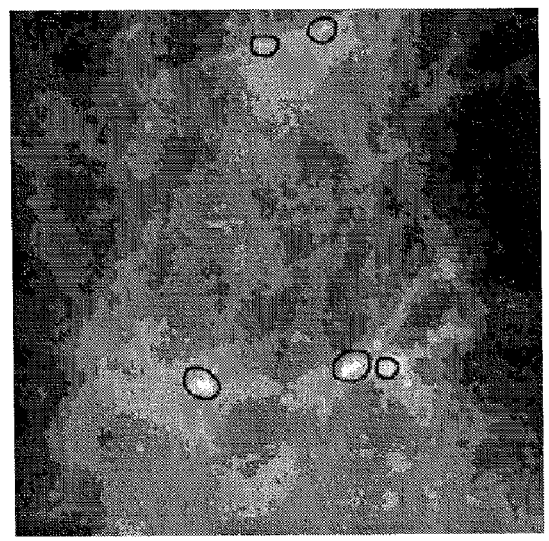
FIG. 5 shows clusters representing micro-calcifications.

For micro-calcifications a similar reasoning applies. Also here, a number lower than 10 classes is satisfactory for clustering, which will not remove micro-calcifications from the final result, if the analysis is performed locally in a region of interest around the location in the image where micro-calcifications are expected to appear. FIG. 5 shows a result of the localized clustering into 5 classes. The indicated regions are documented micro-calcifications that preserve the shapes and sizes of them. However, when applied to the whole image, the number of classes has to be increased in order to preserve such small regions. Moreover, the choice of the number of classes is dictated by the density of the breast as presented in the mammogram. Due to superposition nature of X-ray mammography, different tissues overlap with one another and different tissues may overlap with micro-calcifications. The main difference between micro-calcifications and other structures occurring in mammograms is the size and spatial coherence of them: micro-calcifications normally occur as rounded and small groups of pixels with higher intensity value than the surrounding background.

Figure 7:
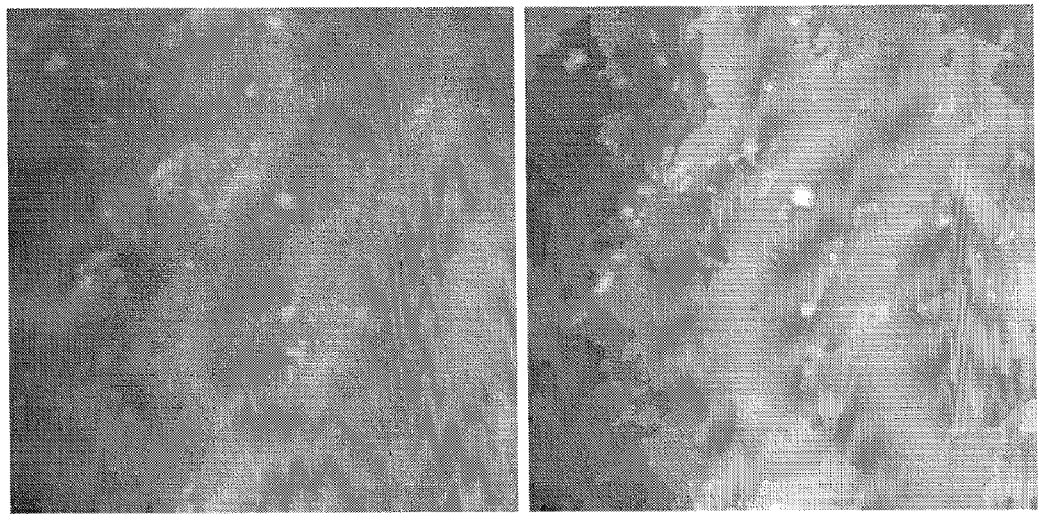
FIG. 7 is a fragment of a mammogram of a breast characterized by low density tissue (left) and result of the clustering (right)
Figure 8:
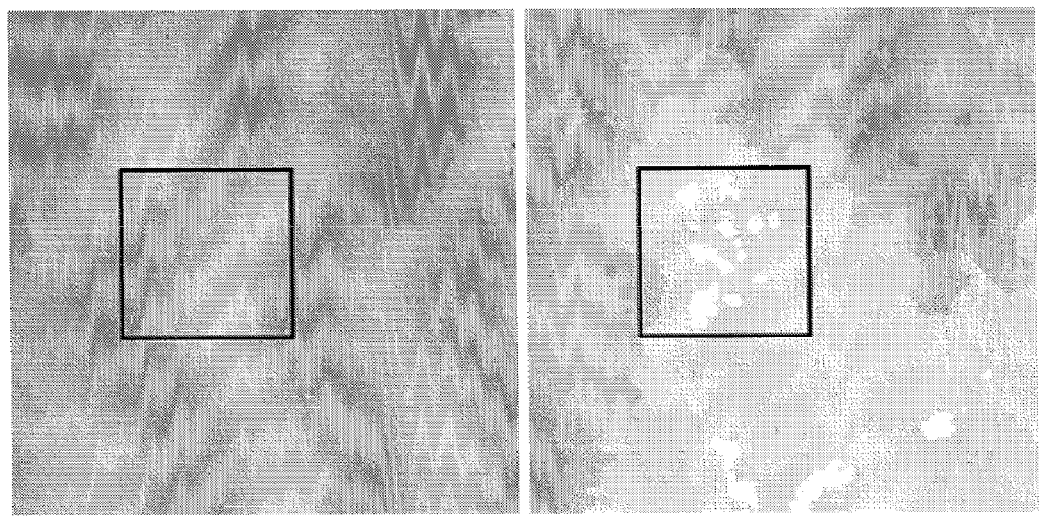
FIG. 8 is a fragment of a mammogram of a breast characterized by high density tissue (left) and result of the clustering (right)

FIGS. 7 and 8 present two fragments of two mammograms with presence of micro-calcifications, one with evident presence of calcium liaisons in a breast consisting mainly of a low density tissue and one where the high density of the breast tissue constitutes a difficult ground for the detection; both presences of micro-calcifications have been confirmed by a radiologist examination. The fragments are extracted after the algorithm has been run on the whole image. The second image shows notably higher density of the mammogram; hence it requires 20 classes to extract the micro-calcifications as opposed to 15 classes for the first mammogram.

The higher resolution of the clustering (i.e. more possible classes) (a) leads to better detection of the micro-calcifications in low-detectability conditions and (b) leads to extraction of smaller micro-calcifications or objects; hence it increases true positive rate and the sensitivity of the algorithm. However, a lower number of classes avoid extraction of undesired objects; hence it leads to lower false negative rate and increases the specificity of the algorithm. In case of analysis of a mammogram presenting a breast characterized by low tissue density, it creates clearer view on the presence of micro-calcifications; however, as shown, it also leads to a lower detection rate in a dense tissue.

The analysis of the results has led us to define a model which is virtually parameter-less. Indeed, 8 as number of classes performs well in 90% of cases. However, this kind of estimation is dependent on the characteristics of the data set, for example it depends on the characteristics of the used scanner for digitizing film mammograms. The number of classes, though not assigned empirically, has to be estimated on the basis of the scanner data or a particular data set.

Algorithm Speed-Up

The Markov Random Field clustering (MRFC) algorithm may be considerably speeded up by using a multiscale decomposition of the image. In this decomposition, Gaussian low-pass (LP) filtering is applied to the original image, and the image is subsequently sub-sampled (represented by the symbol ↓) by a factor of two in each dimension, yielding a level-1 blurred image. This process is iterated a number of times on each level i, yielding the so-called Gaussian pyramid. At each iteration i, an up-scaled (represented by the symbol ↑) coarser-detailed version may be subtracted from the previous finer-detailed version, yielding a band-pass filtered image. The sequence of these band-pass filtered images is termed the Laplacian pyramid. By transforming the band-pass filtered pyramid levels $b_i$ into $b_i'$ and recombining them an enhanced image may be obtained. These operations are summarized in the dashed box of FIG. 14.

Starting from a sufficiently coarse level (e.g. level $g_4$ in FIG. 14), the Markov Random Field clustering algorithm as presented above is applied on the reduced-size image, yielding a segmented image $s_4$. The initialization of segmentation labels for this level is obtained by the K-means clustering algorithm. Because the number of pixel is highly reduced on this level, very fast execution of the ICM sampling scheme is obtained.

Figure 14:
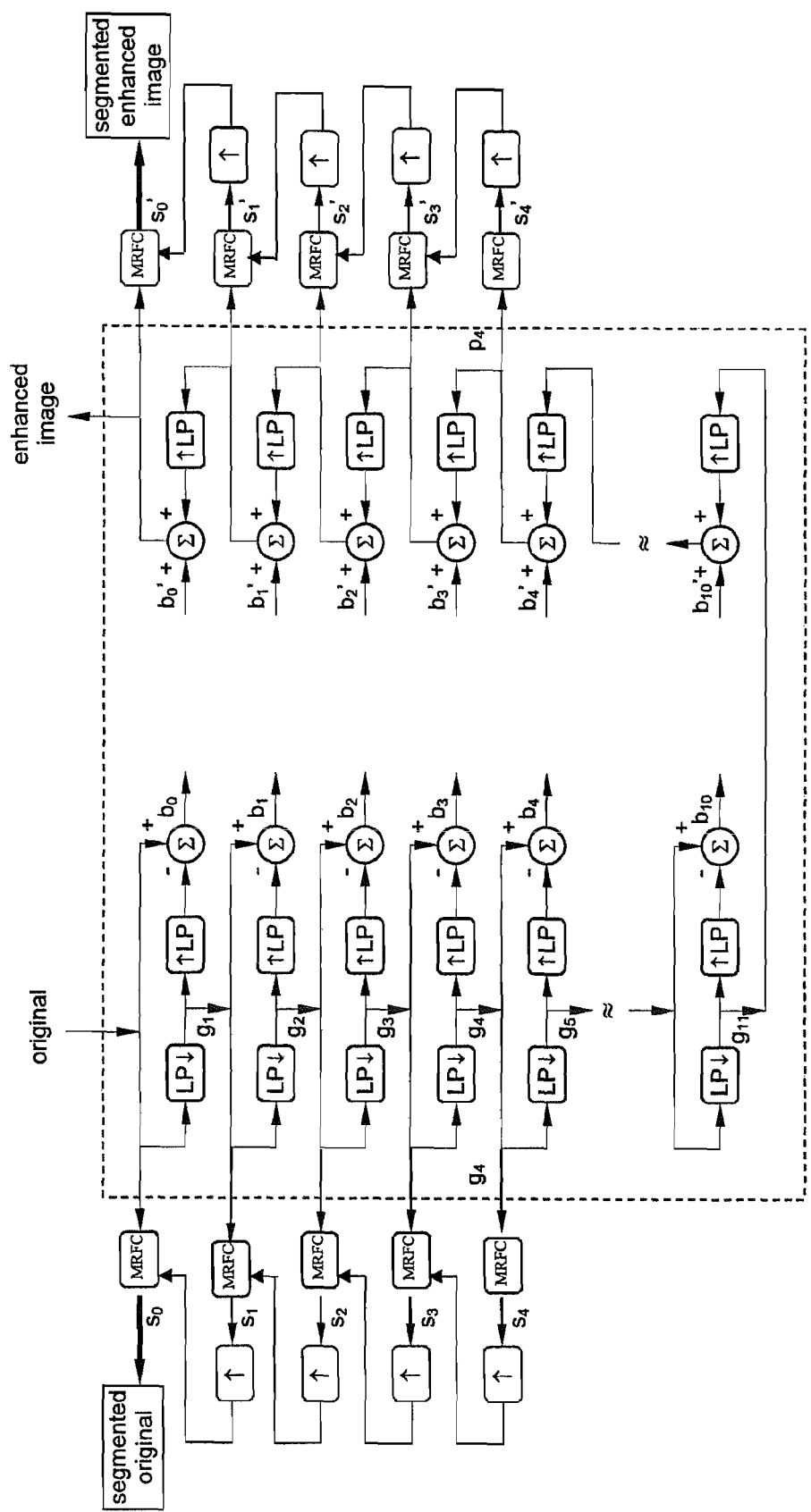
FIG. 14 illustrates a multi-resolution approach for the MRFC method.

The segmented image of this level is then expanded by a factor of two in each dimension by pixel replication of the segmentation labels in each dimension, and this image constitutes the initialization for the next higher-resolution level, which is level 3 in the example of FIG. 14. Using the pixel data of level 3, the MRFC algorithm determines the new segmentation labels, yielding the segmented image $s_3$. Because most of the labels are already correctly obtained from the coarser level, pixels will change label only locally, and hence this iteration will reach its terminal condition also in a very small amount of time.

This process depicted in the previous paragraph is repeated on the next finer levels until the highest resolution level is reached, yielding a segmentation $s_0$ of the original image. The chain of these operations is depicted at the left of the dashed box in FIG. 14.

The operations may also be applied on an enhanced image, where the contrast of subtle regions corresponding to masses is augmented w.r.t. the surrounding background tissue. This chain of operations is depicted at the left of the dashed box in FIG. 14, and starts from the processed level $p_4$ in the example. In general, the MRFC segmentation $s_0'$ of an enhanced image will not exactly be equal to the segmentation $s_0$ of the original image. However, in a clinical environment, the original raw data are mostly not available anymore at the PACS station, and only a contrast-enhanced image will be available. An example of a contrast enhancement processing is the MUSICA™ algorithm of Agfa-Gevaert N.V.

Other hierarchical data structures may be used such as quadtrees, as described in general textbooks on computer vision, for example M. Sonka, V. Hlavac, R. Boyle, Image Processing, Analysis, and Machine Vision, 2nd edition, Brooks/Cole Publishing Company, 1999.

The selection of the suitable number of classes can be alleviated by using a fast multi-resolution computation scheme, the reason being that the optimization (e.g. ICM) is a time-consuming step.

To this purpose a number of classes are input to the speeded up algorithm and output segmentation associated with each number of classes is forwarded to the CAD algorithm for further processing.

Extension Towards MRF Operating on a Multi-Dimensional Feature Vector

The MRF model as outlined previously introduced local spatial context due to the interaction of label assignment of neighboring pixels according to the cliques considered. Larger spatial context may be obtained by applying texture operators, instead of using only the grey value of the pixel only; hence the grouping towards similar labels may be forced due to homogeneity w.r.t. similar textural pattern instead of the intensity of pixels only.

In such a framework, the likelihood potential is now a measure of the distance between the multidimensional texture feature vector of a pixel and the multidimensional of the multidimensional class centroid indicated by the actual label $x_i$. The clique potential remains the sum of so-called penalty values which take value one if the pixels i and i' have been assigned different labels and zero otherwise.

Filter banks may be comprised of a set of derivative filters for different scales and orientations; each filter is called a channel and provides one feature of the multidimensional feature vector. For example, an edge filter corresponds to a first derivative; a bar filter corresponds to a second derivative filter. Both filters may be computed over a number of scales and orientations. Because derivative operations are not isotropic, the filter responses for a given scale may be made isotropic by using only the maximum filter response across all orientations resulting in rotational invariance. An example of a filter bank comprised of band-pass filters is based on the Gabor filter, which is the product of a Gaussian function and a complex sinusoid. Isotropic filters include the Gaussian filter and the Laplacian of Gaussian (LOG) filter computed at different scales. The wavelet transform is another example that may be implemented as a tree of digital filter banks.

When using multidimensional features, other distance measures are preferably used over the pure Euclidian distance to account for the variability in the feature values for a given class.

For example, the weighted Euclidian distance, the weights being inversely proportional to the standard deviation, or the mahalanobis distance, where the weights are expressed by the inverse of the variance/covariance matrix, may be used.

Application to Mammographic Data

The main goal of the algorithm is to delineate anatomical structures present in a mammogram. The algorithm achieves this goal by analyzing simultaneously the grey level values of all image pixels, which allows distinguishing between structures to which a pixel belongs while at the same time enforcing spatial grouping of pixels being assigned them the same class label. The result is characterized by consistent delineation of the anatomical structures without deforming their borders.

Another advantage of the algorithm is the achievement of high performance clustering, while applied on a raw input, i.e., non-processed images. In fact the formulation of the dependence factor in the form of the clique potential provides, apart from the label grouping itself a substitute for typically used pre-processing techniques, i.e., blurring, histogram sharpening etc., which are used to achieve more consistent or smoother input for further processing. The feature is especially important in mammogram analysis, due to the fact that mammograms are characterized by high grey level resolution; therefore any kind of processing requires a method to deal with the natural noise of a scanned mammographic film or a digital detector. This algorithm reduces the need to pre-process images and in a very simple fashion overcomes the problem of noise present in the image.

Still another advantage of the algorithm is the extraction of a consistent data set suitable for further processing. The algorithm's output is a set of labelled regions on a mammogram. The value of a label is directly related to the grey level range of the image. i.e., the higher labels refer to brighter regions. Therefore when further processing is concerned, like mass detection, it may suffice to analyze the regions according to the labels' values to extract ROI's without extensive analysis of the original image data.

Finally, the algorithm may be integrated as a fast pre-processing step in a CAD (computer-aided detection/diagnosis) system. The mathematical formulation of the model allows for a simple implementation. When the sampling scheme is chosen to be the ICM, the algorithm can be implemented as a sliding window filter. In the ICM scheme, all the image pixels are visited from the beginning till the end and then back. At each point a pixel and its eight neighboring pixels are used in the calculation to allow for isotropic influence of the neighboring labels. Therefore, it is sufficient to use sliding window scheme with a window width set to three and only the window function needs to be implemented, which function is to choose the lowest energy label of the central pixel. This scheme provides an easy way to optimize the code in order to achieve the required real-time performance.

The invention is particularly suited to segment mammographic tissue types present in a mammogram such as fibro-glandular disk fatty tissue skin pectoral muscle Region of Interest of lesions such as regions comprising clusters of micro-calcifications or the region comprising a tumor mass.

With FIG. 6 serving as an example, the fibro-glandular disk is represented by the collection of image areas represented by a small set of labels. Micro-calcifications or masses—when present—are represented as superimposed or embedded areas in the fibro-glandular disk associated by as small as only one segmentation label. The fatty tissue at the periphery of the breast region is represented by an elongated area associated by one or two labels. The pectoral muscle presents itself in the segmentation result as a region in the corner of the image, corresponding to a small number of labels, of which the smallest density label has a border with the typical triangular shape. Further automated analysis of these regions in view of a CAD system for mammography is now made possible on the basis of the geometric and radiometric characteristics of these regions.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for segmenting a digital medical image comprising:
   a. computing an initial segmentation class label for each pixel on the basis of a K-means clustering algorithm and computing associated class centroids and gamma functions, a gamma function weighting the importance of likelihood potential and clique potential in an energy function;
   b. computing an energy measure for a current pixel associated with assigning each label in turn to the pixel, the energy measure being a sum of two components:
      a measure of the distance between the pixel's feature value and the value of the centroid indicated by the current segmentation label, and
      a measure of the difference of the assigned label and the label of at least one neighboring pixel;
   c. selecting the label for the current pixel yielding the lowest energy;
   d. recalculating the segmentation class centroids and gamma functions;
   e. proceeding to the next pixel until all pixels in the image are visited;
   f. iterating steps b-e until the class labels of the image pixels do not change so as to yield the final segmentation of the image.

2. A method according to claim 1 wherein the measure of the distance is the Euclidian distance.

3. A method according to claim 1 wherein the measure of the distance is a weighted distance.

4. A method according to claim 1 wherein the measure of the distance is the Mahalanobis distance.

5. A method according to claim 1 wherein the neighboring pixels belong to an isotropic neighborhood.

6. A method according to claim 5 wherein the neighborhood is confined to a 3×3 neighborhood.

7. A method according to claim 1 wherein neighboring pixels are selected according to a specific local orientation.

8. A method according to claim 1 wherein a pixel is represented by its grey value.

9. A method according to claim 1 wherein a pixel is represented by a multi-dimensional feature provided by a multi-dimensional texture operator.

10. A method according to claim 9 wherein the multi-dimensional feature is calculated on the basis of a filter bank of local derivatives.

11. A method according to claim 1 wherein the sequence of steps (d) and (e) is interchanged.

12. A method for segmenting a digital medical image comprising:
   a) computing a multi-resolution (MR) representation of the digital image;
   b) selecting an image at a coarse resolution level in the MR representation as initial image and applying a K-means clustering algorithm to the initial image,
   c) computing an energy measure for a current pixel associated with assigning each label in turn to the pixel, the energy measure being a sum of two components:
      a measure of the distance between the pixel's feature value and the value of the centroid indicated by the current segmentation label, and
      a measure of the difference of the assigned label and the label of at least one neighboring pixel;
   d) selecting the label for the current pixel yielding the lowest energy;
   e) recalculating the segmentation class centroids and gamma functions;
   f) proceeding to the next pixel until all pixels in the image are visited;
   g) iterating steps b to f until the class labels of the image pixels do not change so as to yield the final segmentation of the image;
   j) propagating the labels to the next finer resolution level of the multi-resolution representation;
   h) iterating step (c) to (j) until the original image is segmented.

13. A method according to claim 12 wherein the multi-resolution representation is a Gaussian pyramid representation.

14. A method according to claim 12 wherein the multi-resolution representation is a quadtree.

15. A method according to claim 12 wherein propagating is performed by locally replicating the labels to an image at a higher resolution level in the multi-resolution representation.

16. A method according to claim 12 wherein the sequence of steps (e) and (f) is interchanged.

17. A method according to claim 1 applied to a mammographic image.

18. A method according to claim 12 applied to a mammographic image.

19. A computer software product for segmenting a digital medical image, the product comprising a computer-readable medium in which program instructions are stored, which instructions, when read by a computer, cause the computer to:
   a. compute an initial segmentation class label for each pixel on the basis of a K-means clustering algorithm and computing associated class centroids and gamma functions, a gamma function weighting the importance of likelihood potential and clique potential in an energy function;
   b. compute an energy measure for a current pixel associated with assigning each label in turn to the pixel, the energy measure being a sum of two components:
      a measure of the distance between the pixel's feature value and the value of the centroid indicated by the current segmentation label, and
      a measure of the difference of the assigned label and the label of at least one neighboring pixel;
   c. select the label for the current pixel yielding the lowest energy;
   d. recalculate the segmentation class centroids and gamma functions;
   e. proceed to the next pixel until all pixels in the image are visited;
   f. iterate steps b-e until the class labels of the image pixels do not change so as to yield the final segmentation of the image.

20. A computer software product for segmenting a digital medical image, the product comprising a computer-readable medium in which program instructions are stored, which instructions, when read by a computer, cause the computer to:
   a) compute a multi-resolution (MR) representation of the digital image;
   b) select an image at a coarse resolution level in the MR representation as initial image and applying a K-means clustering algorithm to the initial image,
   c) compute an energy measure for a current pixel associated with assigning each label in turn to the pixel, the energy measure being a sum of two components:
      a measure of the distance between the pixel's feature value and the value of the centroid indicated by the current segmentation label, and
      a measure of the difference of the assigned label and the label of at least one neighboring pixel;
   d) select the label for the current pixel yielding the lowest energy;
   e) recalculate the segmentation class centroids and gamma functions;
   f) proceed to the next pixel until all pixels in the image are visited;
   g) iterate steps b to f until the class labels of the image pixels do not change so as to yield the final segmentation of the image;
   j) propagate the labels to the next finer resolution level of the multi-resolution representation;
   h) iterate step (c) to (j) until the original image is segmented.

* * * * *